United States Patent
Scharp

(10) Patent No.: US 7,308,850 B2
(45) Date of Patent: Dec. 18, 2007

(54) PISTON FOR COMBUSTION ENGINE

(75) Inventor: Rainer Scharp, Vaihingen (DE)

(73) Assignee: Mahle GmbH, Stuttgart (DE)

( * ) Notice: Subject to any disclaimer, the term of this patent is extended or adjusted under 35 U.S.C. 154(b) by 115 days.

(21) Appl. No.: 10/570,102

(22) PCT Filed: Sep. 1, 2004

(86) PCT No.: PCT/DE2004/001946

§ 371 (c)(1),
(2), (4) Date: Mar. 29, 2006

(87) PCT Pub. No.: WO2005/024217

PCT Pub. Date: Mar. 17, 2005

(65) Prior Publication Data

US 2006/0243131 A1    Nov. 2, 2006

(30) Foreign Application Priority Data

Sep. 2, 2003   (DE) ................ 103 40 291

(51) Int. Cl.
*F01B 31/08* (2006.01)
*F16J 1/00* (2006.01)

(52) U.S. Cl. ............................. 92/186; 92/217

(58) Field of Classification Search ............... 92/186, 92/216–219
See application file for complete search history.

(56) References Cited

U.S. PATENT DOCUMENTS

| 2,880,044 A | | 3/1959 | Coffey |
| 4,375,782 A | | 3/1983 | Schieber |
| 4,587,177 A | | 5/1986 | Toaz et al. |
| 6,003,479 A | * | 12/1999 | Evans ..................... 92/186 |
| 2001/0036893 A1 | | 11/2001 | Yoshinori et al. |

FOREIGN PATENT DOCUMENTS

| DE | 10 49 174 A | 1/1959 |
| DE | 1 06 677 C | 6/1974 |
| DE | 1 23 962 C | 1/1977 |
| DE | 29 14 456 A1 | 10/1980 |
| DE | 102 10 570 A1 | 9/2003 |
| GB | 1 214 852 A | 12/1970 |
| GB | 1 343 377 A | 1/1974 |
| JP | 06002613 A | 1/1994 |
| WO | WO 96/006272 A1 | 2/1996 |

* cited by examiner

*Primary Examiner*—F. Daniel Lopez
(74) *Attorney, Agent, or Firm*—Collard & Roe, P.C.

(57) ABSTRACT

The invention relates to an aluminum piston for a combustion engine having a ring element, which is made of NiResist, is placed in the radially outer edge area of the piston head, and which, together with the base body, forms an annular cooling channel. The ring element is fastened to the base body of the piston via a screwed connection.

6 Claims, 2 Drawing Sheets

US 7,308,850 B2

PISTON FOR COMBUSTION ENGINE

CROSS REFERENCE TO RELATED APPLICATIONS

Applicant claims priority under 35 U.S.C. §119 of German Application No. 103 40 291.8 filed Sep. 2, 2003. Applicant also claims priority under 35 U.S.C. §365 of PCT/DE2004/001946 filed Sep. 1, 2004. The international application under PCT article 21(2) was not published in English.

The invention relates to a piston for an internal combustion engine, in accordance with the preamble of claim 1.

An aluminum piston for an internal combustion engine, having a ring element made of Ni resist disposed in the outer region of the piston head, which ring element forms the reinforcement for the groove of a compression ring, is known from the Japanese patent document JP 06002613. In order to securely fix the ring element in place on an aluminum basic body, it is necessary to attach it on the basic body by means of the friction welding method. A disadvantage in this connection is that this attachment method is relatively complicated.

It is the task of the invention to avoid this disadvantage of the prior art. This task is accomplished with the characteristics that stand in the characterizing part of the main claim. Practical embodiments of the invention are the object of the dependent claims.

In this way, the advantage is achieved of being able to provide an aluminum piston with a ring groove reinforcement that can withstand mechanical stress, in quick, simple, and reliable manner.

Figure 1:
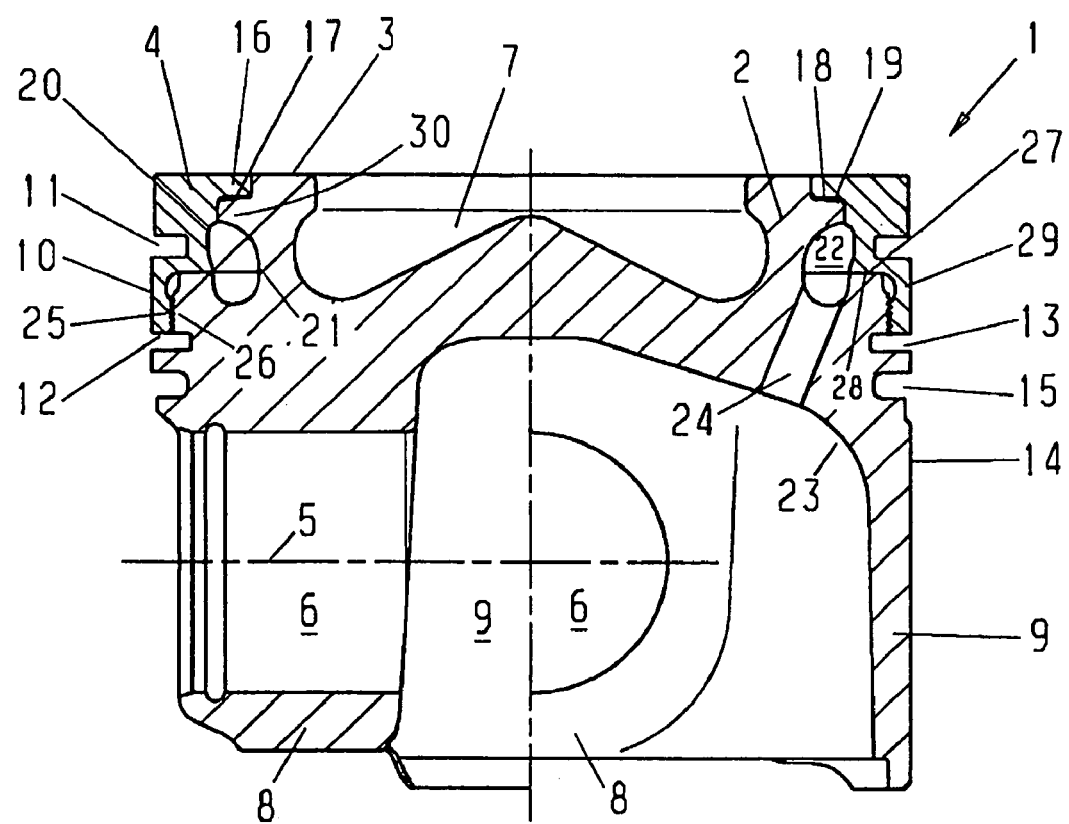
Figure 2:
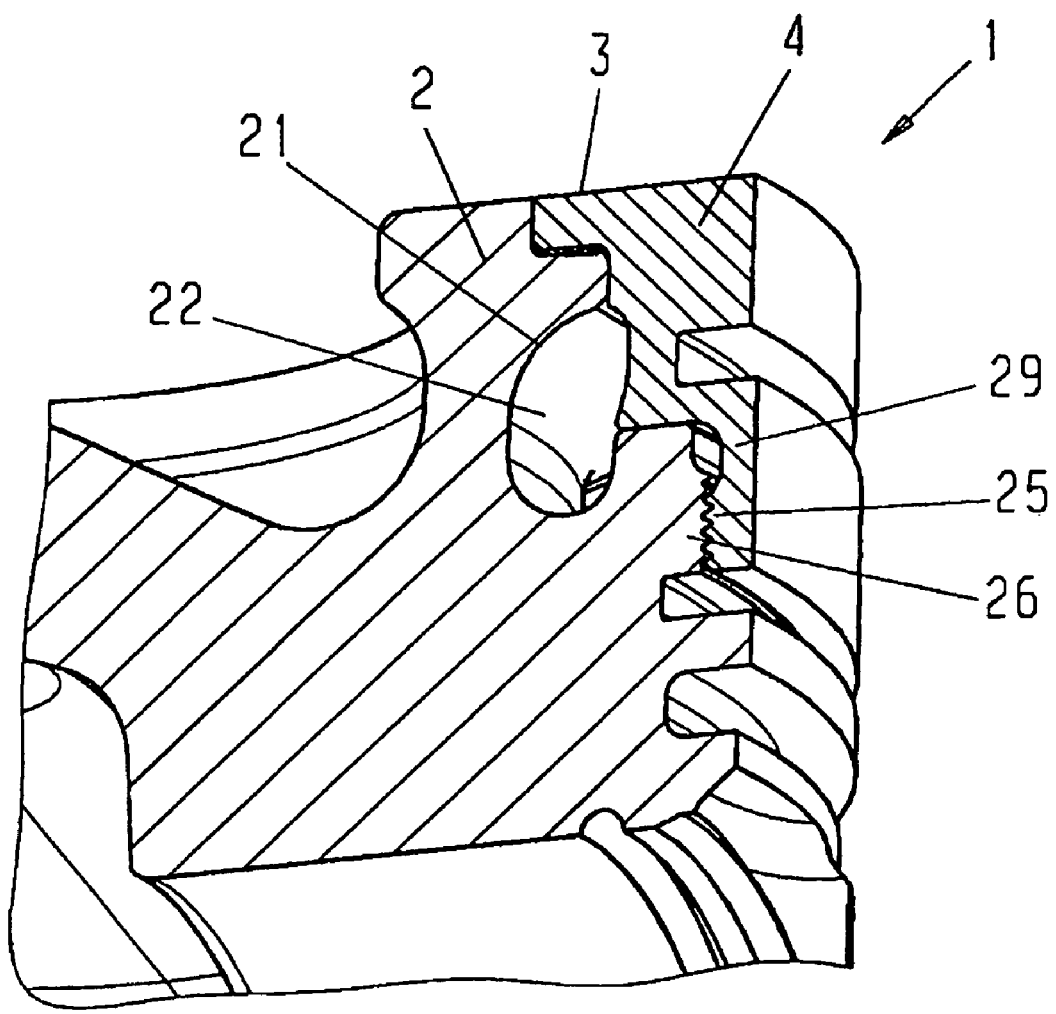

An exemplary embodiment of the invention is described below, using the drawings. These show:

FIG. 1 a piston for an internal combustion engine, having an Ni resist ring element according to the invention, in a sectional drawing consisting of two halves, which drawing shows two longitudinal sections of the piston, offset by 90°, and FIG. 2 an enlarged representation of the section through the edge region of the piston head with the Ni resist ring element.

FIG. 1 shows a piston 1 for an internal combustion engine, in a sectional representation that consists of two halves, of which the left half shows a section of the piston 1 along a longitudinal axis 5 of a pin bore 6, and the right half shows a section through the piston 1 that is offset by 90° relative to the left half.

The piston 1 consists of an essentially cylindrical basic body 2, which has a piston head 3 in whose radially outer edge region a ring element 4 is disposed, by which the radially outer part of the piston head 3 is formed. A combustion chamber 7 is molded into the central region of the piston head 3. Furthermore, the basic body 2 has pin bosses 8 for the pin bores 6 and skirt elements 9 that connect the pin bosses 8 with one another, on its lower side that faces away from the piston head 3. The ring element 4 has a groove 11 for a compression ring, not shown in the figure, on its radially outer mantle surface 10, and forms the radially outer part of the upper groove wall of a second ring groove 13 with its lower face 12. Below the second ring groove 13, the radially outer mantle surface 14 of the basic body 2 has an oil ring groove 15.

A collar 16 is molded onto the region of the ring element 4 that lies on the piston head side, which collar has a ring surface 17 on its lower side that faces away from the piston head 3, which surface lies parallel to the piston head 3 in the present exemplary embodiment, but can also lie at a slant to the piston head 3 in cross-section, so that the ring surface 17 has a conical shape. A recess 18 is molded into the radially outer region of the piston head 3, which recess is step-shaped in cross-section, and has a shape that is complementary to the collar 16, in such a manner that the collar 16 fits into the recess 18 and additionally, a ring-shaped sealing element 19 configured in the manner of a plate spring can be introduced between the ring surface 17 and the recess 18.

Below the ring surface 17, the ring element 4 has a recess 20 on its inside, which forms a ring-shaped cooling channel 22 with a recess 21 that is worked into the outside of the basic body 2, close to the piston head 3. Cooling oil is passed out of the cooling channel 22 by way of an oil channel 24 that connects the piston interior 23 with the cooling channel 22, which oil is introduced into the cooling channel 22 by way of another oil channel, not shown in the figure. In this connection, the sealing element 19 has the task of sealing the piston 1 with regard to combustion gases.

An inside thread 25 disposed on the inside of the ring element 4, close to the lower face 12, which fits onto an outside thread 26 affixed onto the mantle surface 14 close to the second ring groove 13, serve to attach the ring element 4 on the basic body 2. In order to give the screw connection between the basic body 2 and the ring element 4, which connection consists of the inside thread 25 and the outside thread 26, sufficient strength for engine operation, the ring element 4 has a ring-shaped contact surface 27 that is disposed between the inside thread 25 and the recess 20, and lies parallel to the piston head 3, which surface comes to rest on a ring-shaped contact surface 28 that also lies parallel to the piston head 3, and is disposed between the recess 21 and the outside thread 26 of the basic body 2 when the ring element 4 is screwed onto the basic body 2.

An improvement in the strength of the screw connection results from a thinned wall region 29 of the ring element, disposed between the inside thread 25 and the contact surface 27 of the ring element 4 in the axial direction, which region does not have any inside thread, and which undergoes stretching when the ring element is screwed tightly onto the basic body 2. In this way, a mechanical stress is exerted on the screw connection, thereby significantly increasing its strength.

Because of its plate-spring-like configuration, the sealing element 19 is deformed when the ring element 4 is screwed onto the basic body 2, thereby imparting a mechanical bias to it and causing it to exert a force onto the two piston parts 2, 4. In this way, a further improvement of the strength of the screw connection is obtained.

Furthermore, the mantle surface of the basic body 2 has a projection 30 directed radially outward, between the collar 16 and the cooling channel 22, which projection forms the recess 18 on the piston head side, and delimits the cooling channel 22 on its side that faces away from the piston head 3. The projection 30 has such a slight wall thickness that it is deformed when the ring element 4 is screwed onto the basic body 2, and thereby makes an additional contribution to securing the screw connection and preventing it from coming loose.

The basic body 2 is produced from aluminum, which is brought into the desired shape by means of forging. The ring element 4 is produced from Ni resist, using a casting method. Ni resist is an austenitic cast iron with 12% to 20% nickel, which furthermore contains the alloy components manganese, copper, and chrome. Ni resist is particularly suitable for reinforcing piston ring grooves.

FIG. 2 shows an enlarged section through the edge region of the piston 1 on the piston head side, showing the basic body 2 with the ring element 4 screwed onto it. The recess 21 molded into the edge region of the piston head 3, which is covered by the ring element 4 consisting of Ni resist, in order to form the cooling channel 22, can be clearly seen, whereby the ring element 4 is screwed onto the outside thread 26 of the basic body 2 by way of the inside thread 25.

REFERENCE SYMBOL LIST 1 piston
2 basic body
3 piston head
4 ring element
5 longitudinal axis
6 pin bore
7 combustion chamber
8 pin boss
9 skirt element
10 mantle surface
11 groove
12 lower face of the ring element 4
13 second ring groove
14 mantle surface
15 oil ring groove
16 collar
17 ring surface
18 recess
19 sealing element
20 recess
21 recess
22 cooling channel
23 interior of piston
24 oil channel
25 inside thread
26 outside thread
27 contact surface
28 contact surface
29 thinned wall region
30 projection

The invention claimed is:

1. Piston (1) for an internal combustion engine,
having an essentially cylindrical basic body (2) made of aluminum, whose one face forms a piston head (3),
having pin bosses (8) with pin bores (6) disposed on the underside of the basic body (2) that faces away from the piston head (3),
having skirt elements (9) that connect the pin bosses (8) with one another,
having a ring element (4) of Ni resist disposed in the radially outer edge region of the piston head (3), which forms a ring-shaped cooling channel (22) with the basic body (2), and that is attached to the basic body (2) by way of a screw connection that consists of an inside thread (25) lying between the cooling channel (22) and the lower face (12) of the ring element (4), on its side that lies radially on the inside, and a matching outside thread (26) disposed on the mantle surface (14) of the basic body (2), below the cooling channel (22),
the ring element (4) is configured in two steps, in cross-section,
whereby the first step, on the piston head side, is formed in that a collar (16), step-shaped in cross-section, radially directed inward, is molded onto the region of the ring element (4) on the piston head side, followed by the cooling channel (22) on the pin boss side, and
whereby the second step is formed in that the ring element (4) has a ring-shaped contact surface (27) that lies parallel to the piston head (3), between the cooling channel (22) and the inside thread (25), proceeding from the cooling channel (22) and pointing radially outward, which comes to rest on a contact surface (28) when the ring element (4) is screwed onto the basic body (2), which surface is molded into the basic body (2) on the piston head side, between cooling channel (22) and outside thread (26),
and that the ring element (4) has a wall region (29) between the contact surface (27) and the inside thread (25), which lies axially and is thinned to such an extent that it can be stretched in the axial direction when the ring element (4) is screwed onto the basic body (2).

2. Piston (1) for an internal combustion engine according to claim 1, wherein the collar (16) has a ring surface (17) on its lower side that faces away from the piston head (3), which surface lies essentially parallel to the piston head (3), that a recess (18) is molded into the radially outer region of the piston head (3), which recess is step-shaped in cross-section, and has a shape that is essentially complementary to the collar (16), and that a ring-shaped sealing element (19) configured in the manner of a plate spring is disposed between the ring surface (17) and the recess (18), which element can be deformed when the ring element (4) is screwed onto the basic body (2).

3. Piston (1) for an internal combustion engine according to claim 1, wherein the basic body (2) is produced by means of forging.

4. Piston (1) for an internal combustion engine according to claim 1, wherein the ring element (4) is produced by means of a casting method.

5. Piston (1) for an internal combustion engine according to claim 1, wherein the ring element (4) has a groove (11) for a compression ring on its radially outer mantle surface (10), and that the lower face (12) of the ring element (4) forms at least the radially outer part of the upper groove wall of a ring groove (13) that is molded into the basic body (2).

6. Piston (1) for an internal combustion engine according to claim 1, wherein the basic body (2) has a ring-shaped, elastically resilient projection (30) directed radially outward, which projection forms the recess (18) on the piston head side, forms the delimitation of the cooling channel (22) on the piston head side, and can be deformed when the ring element (4) is screwed onto the basic body (2).

* * * * *